Sept. 6, 1927.  
E. E. BROWN ET AL  
1,641,800

SEPTIC TANK

Filed July 6, 1926

Witness:  
Fred C. Fischer.

Inventors:  
Elmer E. Brown  
and Mark C. Dixon,

By F. G. Fischer,  
Attorney.

Patented Sept. 6, 1927.

1,641,800

UNITED STATES PATENT OFFICE.

ELMER E. BROWN, OF KANSAS CITY, MISSOURI, AND MARK C. DIXON, OF KANSAS CITY, KANSAS.

SEPTIC TANK.

Application filed July 6, 1926. Serial No. 120,682.

Our invention relates to septic tanks and our object is to provide an apparatus which can be installed at comparatively small cost and will dispose of sewage in an efficient and sanitary manner.

In order that the invention may be fully understood, reference will now be had to the accompanying drawing, in which.

Figure 1:
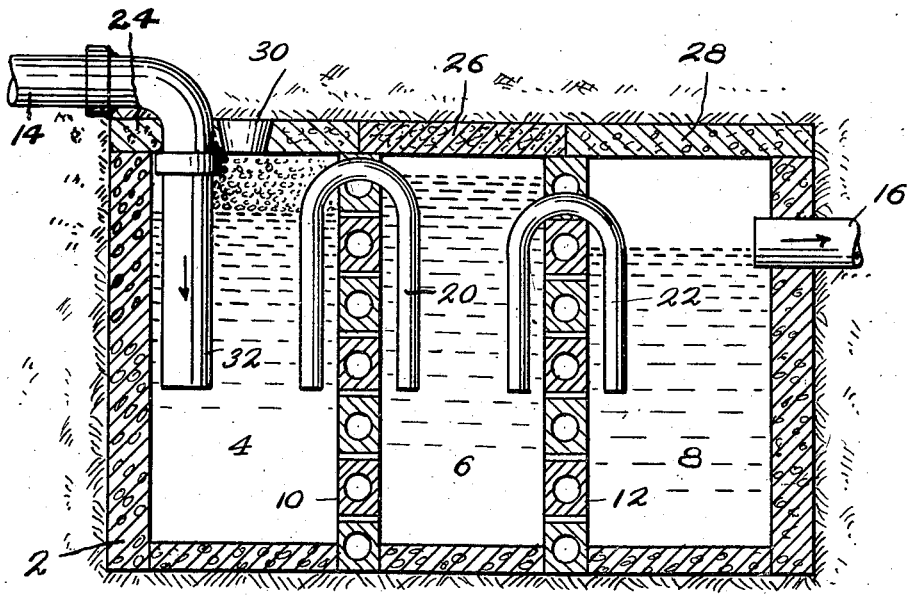
Fig. 1 is a central vertical section of the apparatus.
Figure 2:
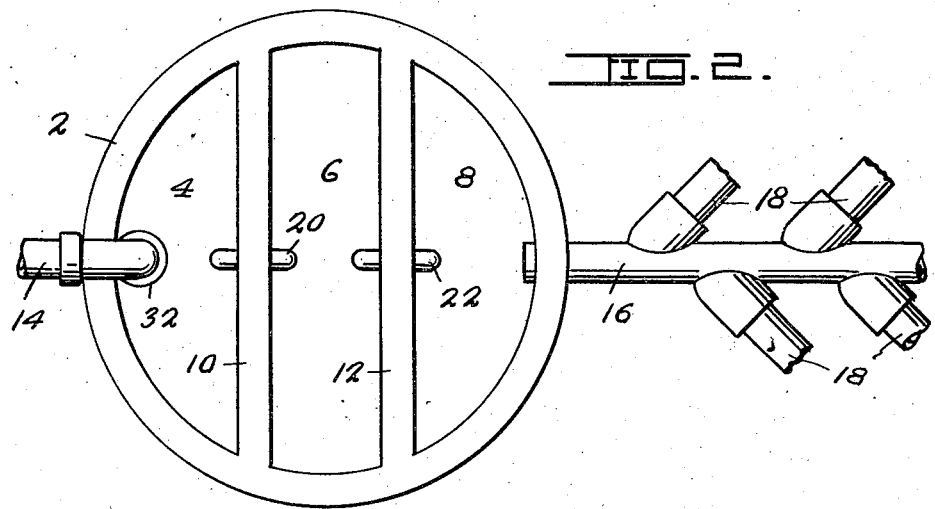
Fig. 2 is a plan view of the apparatus with the caps for covering the septic tank removed.

In carrying out the invention, we provide a tank 2 which may be built of concrete or other suitable material which will prevent leakage of sewage through the walls of said tank.

The tank 2 is divided into a series of compartments 4, 6 and 8 by partitions 10 and 12. The number of compartments and partitions may be increased or diminished according to the capacity of the tank 2.

The sewage is admitted to the compartment 4 through an inlet pipe 14, and the purified sewage is permitted to discharge from the compartment 8 through an outlet pipe 16 which has a suitable number of obliquely disposed branch pipes 18.

The partitions 10 and 12 consist, preferably, of porous blocks or other suitable filtering material so that the liquid content of the sewage entering the compartment 4 will be filtered in its passage to the outlet pipe 16 and the branch pipes 18, which are also preferably of porous material to permit the liquid to seep through into the surrounding earth.

When a large quantity of liquid suddenly enters the compartment 4 it is permitted to escape to the outlet pipe 16 through inverted U-shaped pipes 20 and 22, embedded in the upper portions of the partition 10 and 12, respectively.

Caps 24, 26 and 28 of concrete or other suitable material are provided for covering the compartments 4, 6 and 8, respectively, and the cap 24 has a removable plug 30 through which a suitable solvent may be introduced into the compartment 4 to hasten reduction of the solid matter in the sewage to such condition that it can readily pass off with the liquid content.

In practice as the sewage enters the compartment 4 through the inlet pipe 14 the solid matter floats to the top where it is purified and reduced through well-known bacterial action to a condition where it readily passes off with the liquid. Under ordinary conditions the liquid seeps through the filtering walls 10 and 12 and escapes through the pipes 16 and 18 in a purified and odorless state, but should a large quantity of liquid suddenly enter the tank the surplus readily passes to the outlet pipes through the inverted U-shaped pipes 20 and 22 instead of backing up into the inlet pipe 14.

With the U-shaped pipes 20 and 22 having their open ends extending some distance below the top of the tank 2, the solid matter will be prevented from passing from the compartment 4 into the compartments 6 and 8, through said pipes 20 and 22, and by providing the inlet pipe 14 with a downward extension 32 the incoming sewage will be directed downwardly into the compartment 4, so as to avoid creating a current which would disturb the action of the bacteria on the solid matter which floats to the upper portion of said compartment 4.

From the foregoing description it is apparent that we have provided a sewage purifying apparatus embodying the advantages above pointed out, and while we have shown and described the preferred construction combination and arrangement of parts we reserve the right to all such changes and modifications as properly fall within the spirit and scope of the invention as claimed.

Having thus described our invention, what we claim and desire to secure by Letters Patent, is:

An apparatus of the character described consisting of a tank, a cover to said tank, two hollow porous partitions extending from the bottom of the tank to said cover and dividing the tank into three compartments, an inlet to the initial compartment and provided with a downward extension, an inverted U-shaped pipe extending through the upper portion of one partition to establish communication between the initial and intermediate compartments, a second inverted U-shaped pipe arranged at a slightly lower level than the upper portion of the first-mentioned U-shaped pipe and extending through the second partition, and an outlet to the last compartment arranged at a slightly lower level than the upper portion of the second U-shaped pipe.

In testimony whereof we affix our signatures.

ELMER E. BROWN.
MARK C. DIXON.